United States Patent [19]
Marcel

[11] Patent Number: 5,712,982
[45] Date of Patent: Jan. 27, 1998

[54] TDMA POINT-TO-MULTIPOINT TRANSMISSION NETWORK WITH A MULTIFRAME WHICH INCLUDES A SINGLE CONTINUOUS STREAM OF DATA SUBFRAMES AND A SINGLE FREE PERIOD FOR RESPONSE-TIME MEASUREMENTS

[75] Inventor: François Marcel, Orsay, France

[73] Assignee: Alcatel Cit, Paris, France

[21] Appl. No.: 531,105

[22] Filed: Sep. 20, 1995

[30] Foreign Application Priority Data

Sep. 23, 1994 [FR] France ................. 94 11401

[51] Int. Cl.⁶ .................. G06F 13/372; G06F 13/376; H04L 5/22
[52] U.S. Cl. .................. 395/200.17; 395/200.13; 395/200.19; 370/503; 370/442; 370/508; 370/510
[58] Field of Search .................. 370/462, 362, 370/249, 250, 257, 503, 442, 508, 510; 395/200.17, 200.13, 200.19

[56] References Cited

U.S. PATENT DOCUMENTS

| | | | |
|---|---|---|---|
| 5,177,739 | 1/1993 | Basnuevo et al. | 370/449 |
| 5,341,365 | 8/1994 | Clark | 370/508 |
| 5,359,602 | 10/1994 | Diaz et al. | 370/401 |
| 5,450,409 | 9/1995 | Diaz et al. | 370/470 |
| 5,572,349 | 11/1996 | Hale et al. | 359/137 |
| 5,579,321 | 11/1996 | Van Grinsven et al. | 370/442 |

FOREIGN PATENT DOCUMENTS

| | | |
|---|---|---|
| 0229684 | 7/1987 | European Pat. Off. . |
| WO8805233 | 7/1988 | WIPO . |
| WO9222151 | 12/1992 | WIPO . |
| WO9319540 | 9/1993 | WIPO . |

Primary Examiner—Thomas C. Lee
Assistant Examiner—Ki Kim
Attorney, Agent, or Firm—Sughrue, Mion, Zinn, Macpeak & Seas, PLLC

[57] ABSTRACT

In a time division multiple access point-to-multipoint transmission network, data is transmitted from a central station to local stations in multiframes containing a plurality of frames and a single free period allowing transmit time measurements and reflectometry measurements. Data is transmitted from the local stations to the central station in the form of multiframes containing a plurality of frames and a single free period allowing transmit time measurements and reflectometry measurements, each frame including subframes sent by the local stations, and each local station sending one or more of the subframes contained in a frame. The multiframes are constructed in a way that underuses the data sources, to obtain free periods between the frames, and by time-shifting the frames to construct a single free period per multiframe. Applications include telecommunication networks.

8 Claims, 5 Drawing Sheets

TDMA POINT-TO-MULTIPOINT TRANSMISSION NETWORK WITH A MULTIFRAME WHICH INCLUDES A SINGLE CONTINUOUS STREAM OF DATA SUBFRAMES AND A SINGLE FREE PERIOD FOR RESPONSE-TIME MEASUREMENTS

BACKGROUND OF THE INVENTION

1. Field of the Invention

The invention concerns a time division multiple access point-to-multipoint transmission network including a central station and a plurality of local stations.

2. Description of the Prior Art

In a network of this kind the central station sends forward frames containing data addressed to the local stations, each forward frame having a fixed duration and including common data addressed to all local stations or separate data for respective separate local stations. Each local station sends return subframes each having a fixed duration and including data sent only by that local station and addressed to the central station. The local stations send these subframes in such a way that they do not overlap in time and constitute a return frame.

As the local stations are at different distances from the central station, the transmit time between a local station and the central station is not the same for all the stations. Means for measuring the transmit times determine the times for each local station to transmit so that the subframes sent by all the local stations are received by the central station without overlapping. A known way to measure transmit times involves the central station and the local stations ceasing to send data during periodic time periods.

For example, European patent application EP-A-0 188 117 describes a time division multiple access network in which:

a central station sends frames having a duration of 125 microseconds including a plurality of subframes followed by an address addressed to one of the local stations and telling it to send a test message, followed by a free period for measuring the transmit time; each subframe contains data addressed to a separate local station;

the local stations each send in turn a subframe containing data to be transmitted from that local station to the central station.

Each local station includes transmit time measuring means which determine the transmit time between that local station and the central station and deduce therefrom the times at which the local station can send a subframe, so that the central station received a frame made up of successive subframes that do not overlap.

This prior art document describes a method of measuring transmit times that entails:

the central station sending a local station an address designating that local station and commanding it to send a test message, this address being inserted into a forward frame after the data subframes and before the free period;

that local station sending the central station a test message as soon as the local station has recognized its address, the free period in the forward frames and the free period in the return frames each having a duration sufficient for the test message always to occur within these periods regardless of the distance to a local station; this is in order to avoid collision with data;

reception of the test message at the central station followed by its immediate retransmission in the free period of a forward frame;

reception of the test message in the local station that sends it, determination of the transmit time between the local station and the central station, and deduction from the latter of times at which that local station can send subframes.

This method requires a free period in the forward frames and a free period in the return frames each having a duration at least equal to the round trip transmit time plus the duration of the test message; this is to prevent collisions between a test message and data transmitted by the central station or by other local stations.

In the example described in this prior art document the local stations are connected to a private telephone exchange and are distributed within the bounds of a building. The round trip transmit time is therefore in the order of 10 microseconds. The frames have a fixed duration of 125 microseconds, which corresponds to the sampling period of a standard telephone channel in a digital telephone network. It is possible to leave a free period of about 10 microseconds in a 125 microsecond frame without seriously degrading the transmission performance of the network. A free period of this duration is entirely satisfactory for a network restricted to one building.

However, this method cannot be used in a network covering greater distances, such as a public telecommunication network. A network of this kind is connected to local stations at much greater distances, possibly up to 10 km. The round trip transmit time then reaches values in the order of 100 microseconds. It is not possible to sacrifice the major part of the frame duration to provide a free period having a duration in the order of 100 microseconds.

The prior art includes a transmit time measuring method that can accommodate a free period of very much shorter duration than the round trip transmit time. This method is tolerant of collisions that may occur between the test messages and data. It is more complex, however. It includes a step of approximate estimation of the transmit time followed by a step of more refined estimation.

The prior art further includes methods of testing a transmission medium in a network of this kind using reflectometry, but these methods usually entail interrupting operation of the network since they require a free period that can be as much as twice the round trip transmit time.

Document EP-A-0 229 684 describes a time division multiple access point-to-multipoint transmission network in which data is transmitted from a central station to local stations in multiframes including a plurality of frames addressed to respective local stations. Each multiframe includes a single free period for transmit time measurements and reflectometry measurements. Data is transmitted from local stations to a central station in the form of multiframes including a plurality of frames and a single free period for transmit time measurements and reflectometry measurements, each frame including subframes sent by respective local stations, each local station sending one or more of the subframes contained in a frame. The free period in each multiframe can have a duration equal to twice the maximal round trip transmit time without seriously degrading the transmission performance of the network, since the free periods occur much less frequently than if there were to be a free period in each frame.

This prior art document also describes means for forming multiframes with a single free period in each multiframe. These means apply temporal compression to the data to be transmitted.

An object of the invention is to propose a point-to-multipoint transmission network in which the central station and the local stations include means for sending multiframes including a single free period using a method other than the temporal compression method.

SUMMARY OF THE INVENTION

The invention consists in a time division multiple access point-to-multipoint transmission network including a central station and a plurality of local stations;

- each local station including means for sending return multiframes including a plurality of return frames and a single free period having a duration allowing measurements to be made, each return frame including a plurality of return subframes each having a fixed duration and containing data sent by that local station only and addressed to the central station, return subframes being sent at predetermined times decided on by transmit time measurement means so that subframes sent by all the local stations are received by the central station without overlapping and constitute a return frame;
- the central station including means for sending forward multiframes including a plurality of forward frames and a single free period having a duration allowing measurements to be made;
- wherein, in the central station and/or at least one local station, the means for sending multiframes include:
  - means for sampling from a data source a series of data packets, two consecutive packets being separated by a free period, and for inserting each packet into a frame, two consecutive frames being separated by a free period; and
  - time-shift means for inserting a predetermined number of frames into a multiframe, time-shifting said frames to eliminate the free periods between them and thus to constitute a multiframe including a single continuous stream of time-shifted frames and a single free period.

The invention will be better understood and other features will emerge from the following description and the appended drawings.

DETAILED DESCRIPTION OF THE PREFERRED EMBODIMENTS

Figure 1:
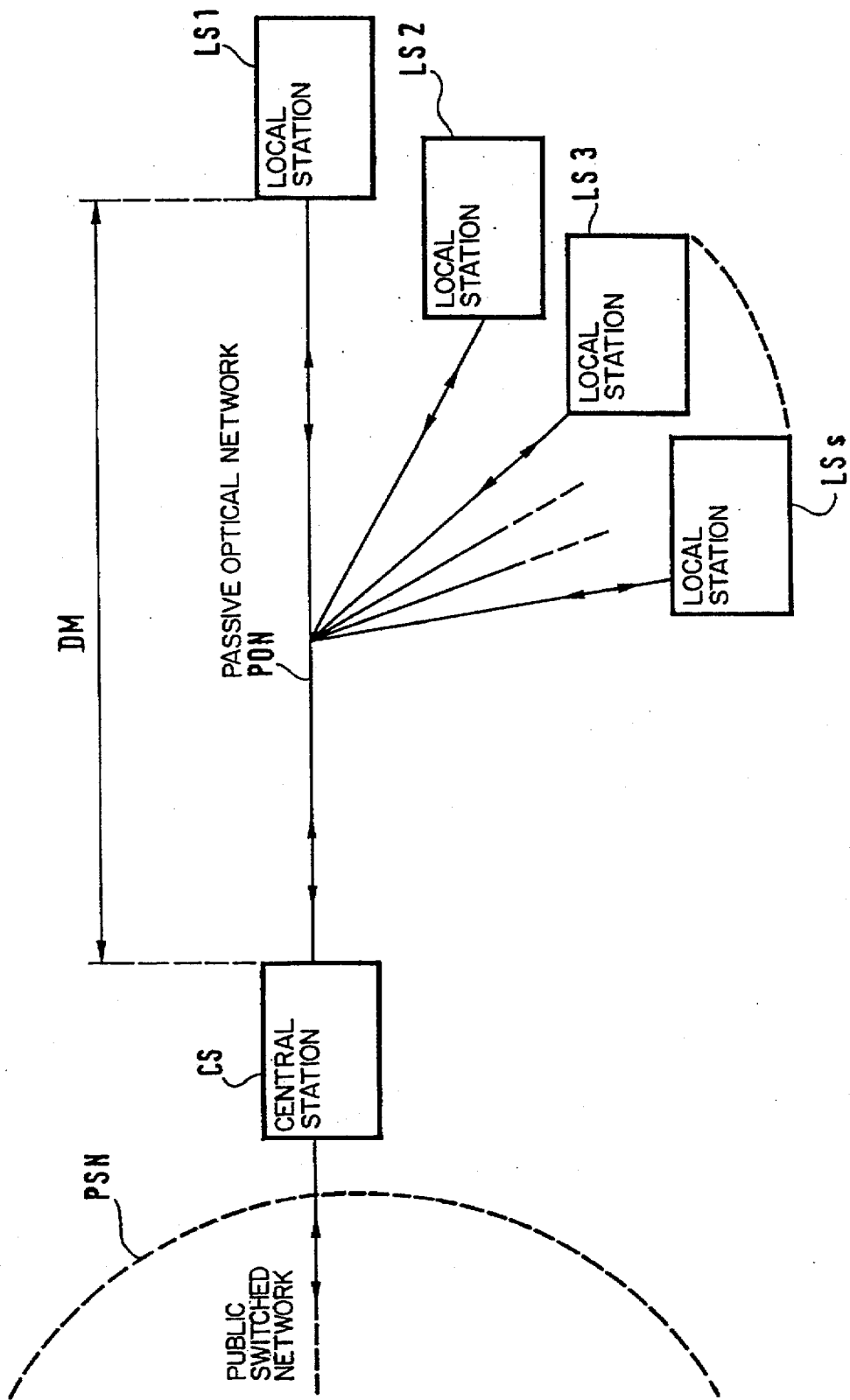
FIG. 1 represents the block schematic of one example of a network in accordance with the invention.

FIG. 1 represents the block schematic of one example of a network in accordance with the invention. In this example the central station sends data addressed to all the stations. In other examples the central station could send different data to different local stations, by allocating each frame of a multiframe to a given local station.

The central station CS communicates with a public switched network PSN and with local stations LS1, LS2, LS3, . . . , LSs via a passive optical network PON conveying signals in both directions. The central station CS transmits data addressed to all the local stations LS1, . . . , LSs and the latter each transmit data to the central station CS. The central station CS exchanges signals with the public switched network PSN in the form of asynchronous transfer mode cells at an average rate of one cell every 125 microseconds, or a multiple of this rate, which corresponds to the standard period for sampling a telephone channel in digital telephone networks. Each local station LS1, . . . , LSs exchanges data with a terminal (not shown), for example a multimedia microcomputer, at an average rate of one cell every 125 microseconds, for example.

The local stations LS1, . . . , LSs are at various distances from the central station CS. The remotest local station LS1 is at a distance DM in the order of 10 km, which implies a round trip transmit time in the order of 100 microseconds. To allow transmit time measurements when a station connects to the network and to allow reflectometry measurements to monitor the state of the links without collisions between the measurement signals and the data it is necessary to interrupt the sending of data in both directions during time periods each having a duration of at least 100 microseconds.

Figure 2:
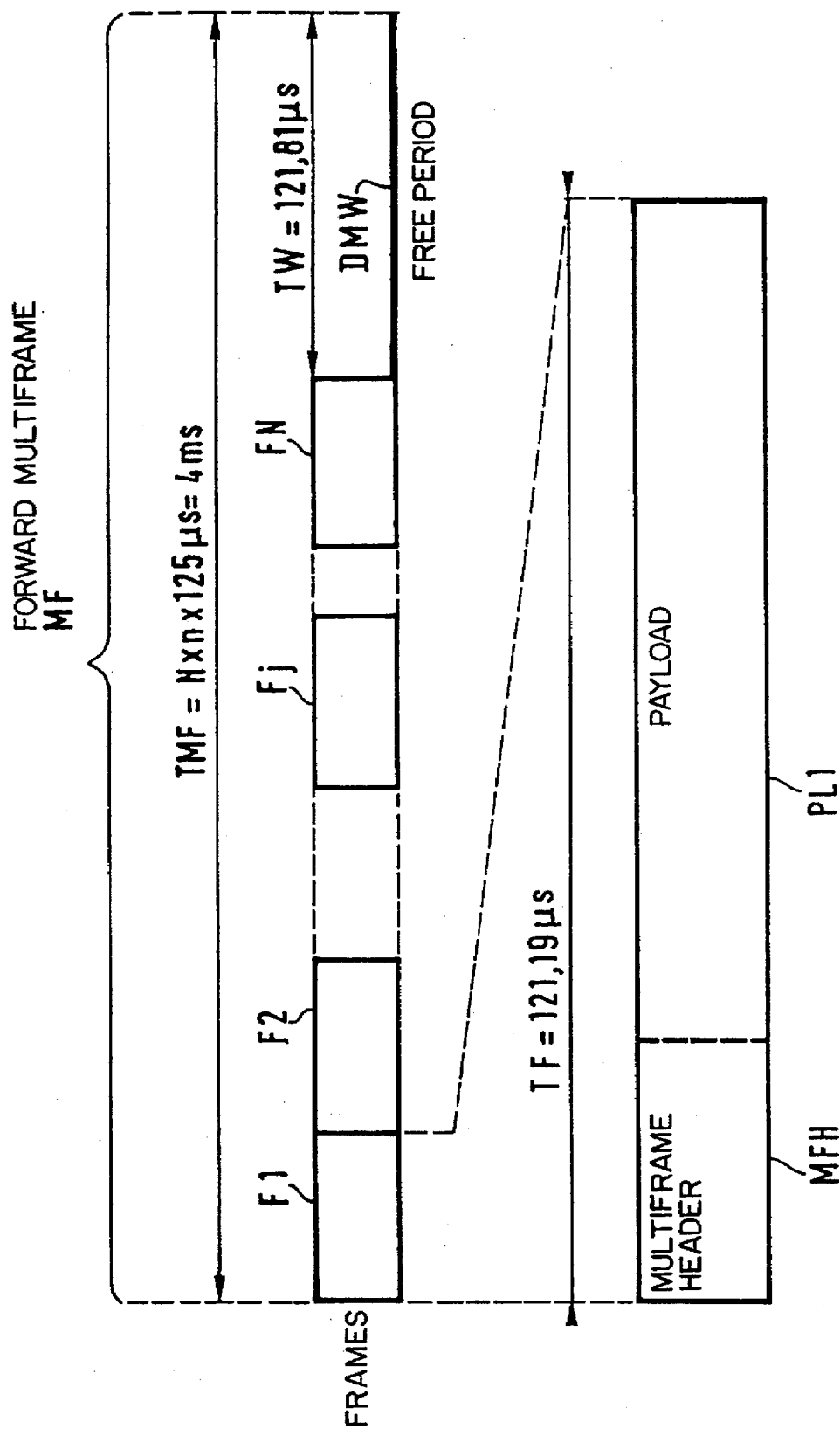
FIG. 2 is a schematic representation of a forward multiframe and one of the frames constituting it.

FIG. 2 shows the structure of a forward multiframe MF sent by the central station CS in accordance with the invention. To simplify the implementation of the network, each multiframe MF has a duration TMF that is equal to a multiple of the telephone channel sampling period. In this example:

$$TMF = N \times n \times 125 \text{ } \mu s = 4 \text{ ms,}$$

where $n \times 125$ μs is the duration of each frame F1, . . . , FN constituting the multiframe, n is an integer and N is the number s of frames contained in a multiframe. The number N can be equal to the number of local stations, but this is not essential. The frames F1, . . . , FN are followed by a free period DMW having a fixed duration TW. In this example, TW is equal to 121.81 μs, allowing transmit time measurements and reflectometry measurements for a maximal distance DM in the order of 10 km; n is equal to 1 and the fixed duration of each frame is TF=121.19 μs, which is slightly less than the telephone channel sampling period.

The content of each frame depends on the intended application. If the central station sends different data to different local stations, each frame (for example frame Fj) is divided into subframes (not shown) addressed to different local stations LS1, . . . , LSs. If the central station CS sends coon data to all the local stations the data can be distributed in any way within the frames F1, . . . , FN. In this latter case, the frame F1 includes a multiframe header MFH and a payload PL1 but all the other frames F2, . . . , FN contain only a payload. The header MFH is used for administration of the data transmitted in the payload of all the frames F1, . . . , FN constituting the multiframes MF. In one implementation in which the bit rate of the forward multiframes is 155.52 Mbit/s, each frame includes 2356 bytes, the first frame F1 including a header MFH of 16 bytes and a payload PL1 of 2340 bytes.

Figure 3:
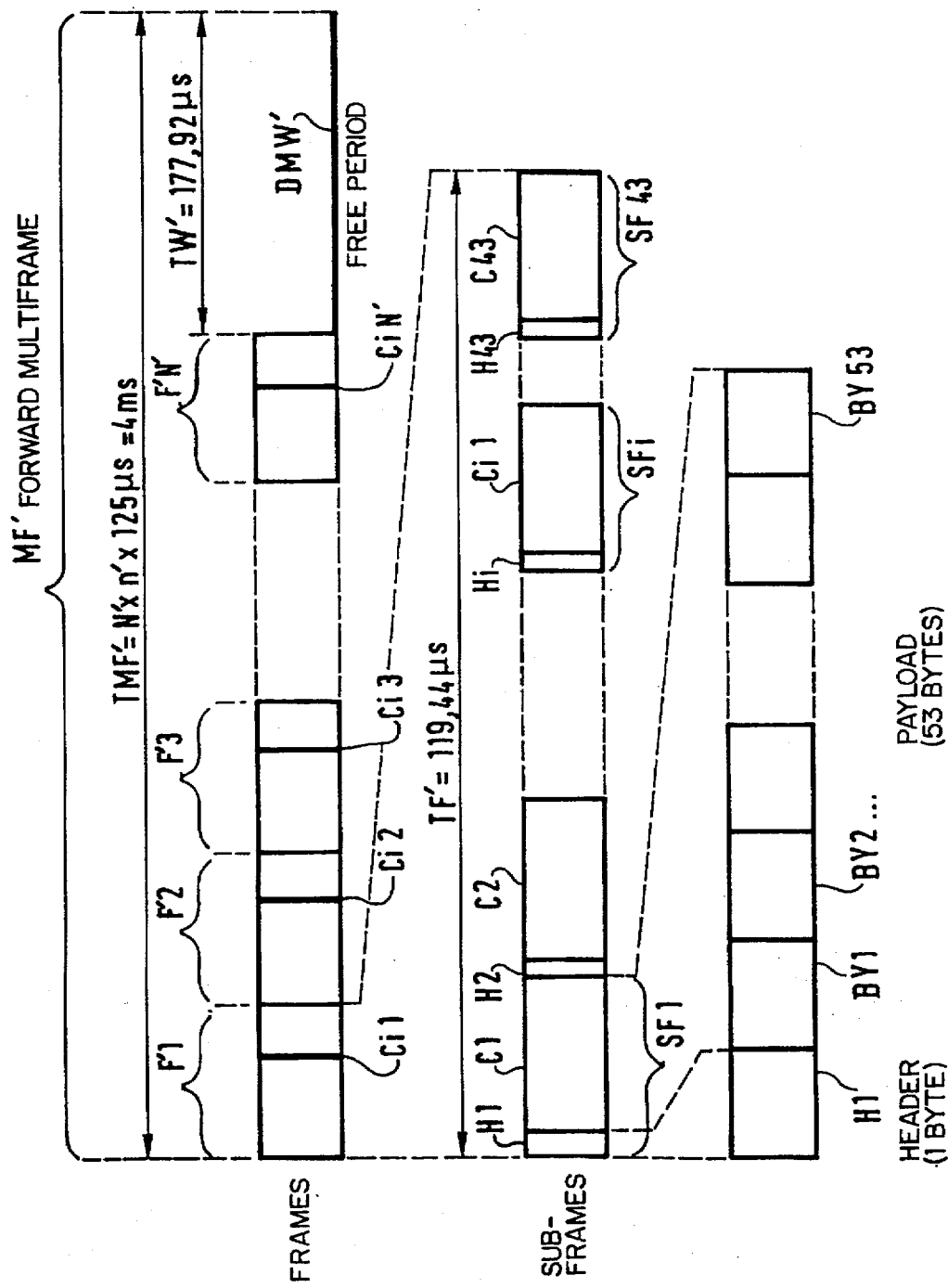
FIG. 3 a schematic representation of a return multiframe, one of the frames constituting it and a subframe constituting one of those frames.

FIG. 3 shows the structure of a forward multiframe MF'. In this example, it has a fixed duration:

$$TMF' = N' \times n' \times 125 \text{ } \mu s = 4 \text{ ms,}$$

where N' is the number of frames F'1, . . . , F'N' in the multiframe MF' and n'×125 μs is the duration of each of these frames, n' being an integer. These frames are followed by a free period DMW' having a duration TW'=177.92 μs allowing transmit time measurements and reflectometry measurements. The duration of this free period being very much greater than 100 microseconds, it allows transmit time measurements for a maximal distance DM greater than 10 km.

Each frame has a fixed duration TF=119.44 μs and in this example is made up of 43 subframes SF1, ..., SFi, ..., SF43. Each local station LS1, ..., LSs sends one or more subframes according to the quantity of data that it has to send, the allocation of the subframes being fixed for the duration of a call. The time at which a station sends its subframe or subframes is determined by transmit time measuring means so that the subframes SF1, ..., SF43 reach the central station CS without overlapping and constitute a continuous data packet.

In this example each subframe, for example subframe SFi, is made up of a header with a fixed length of 1 byte, including a guard space, and a payload Ci1 made up of 53 bytes which can be samples of a plurality of standard telephone channels or the 53 bytes BY1, ..., BY53 of an asynchronous transfer mode cell. For example, if a local station LSi receives from a data source a sequence of successive cells Ci1, ..., CiN', ..., at the average rate of one cell every 125 μs, these cells are transported in respective frames F'1, ..., F'N' of the multiframe MF'.

This transmission network achieves good transmission performance despite the existence of free periods to allow for transmit time measurements having durations in the order of 100 μs, since these free periods are repeated at multiples of the duration of the frame, which reduces the relative size of the free periods compared to the data transmitted. For example, if each multiframe is made up of 32 frames each having a duration of 125 microseconds, and if the free period duration is 100 microseconds, the free periods occupy only 2.4 % of the total time.

These free periods have a duration enabling them also to be used to test the status of the network transmission medium, by reflectometry.

The method used to form the forward multiframes MF and to form the return multiframes MF' entails underusing the capacity of each data source, i.e. requiring it to supply fewer data packets than it could supply during a multiframe.

Figure 4:
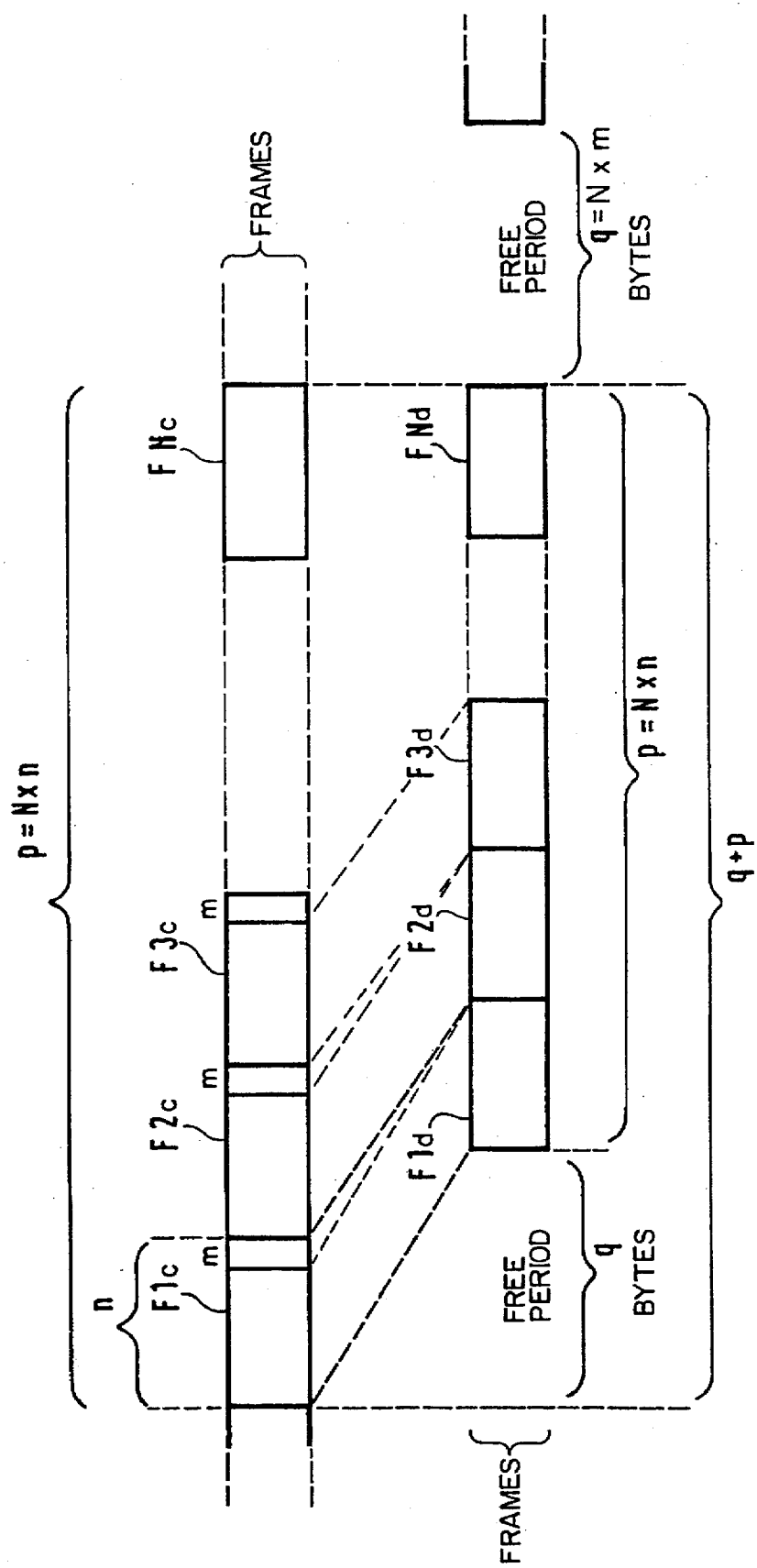
FIG. 4 represents a timing diagram illustrating the operation of the means for sending multiframes in a manner that underuses the capacity of a data source but retains its bit rate.

FIG. 4 represents a timing diagram illustrating this underuse of the capacity of a data source. The data source has a capacity such that it could supply an uninterrupted stream of bytes at a fixed bit rate H. In fact it is used to supply frames F1c, F2c, F3c, ..., FNc including n–m bytes, two consecutive frames being separated by a free period corresponding to bytes. A multiframe is constructed by concatenating N frames F1c, ..., FNc to constitute an uninterrupted stream of frames F1d, ..., FNd at the same bit rate H but time-shifted relative to the frames F1c, ..., FNc so as to combine into a single free period the N free periods each corresponding to m bytes.

The free period chosen for the multiframe corresponds to q bytes, with q=N×m, and consequently the choice of the duration of the free period in the multiframe determines the number of bytes corresponding to the free period between two successive frames supplied by the source. The underuse of the source can be represented by the ratio m/n.

Figure 5:
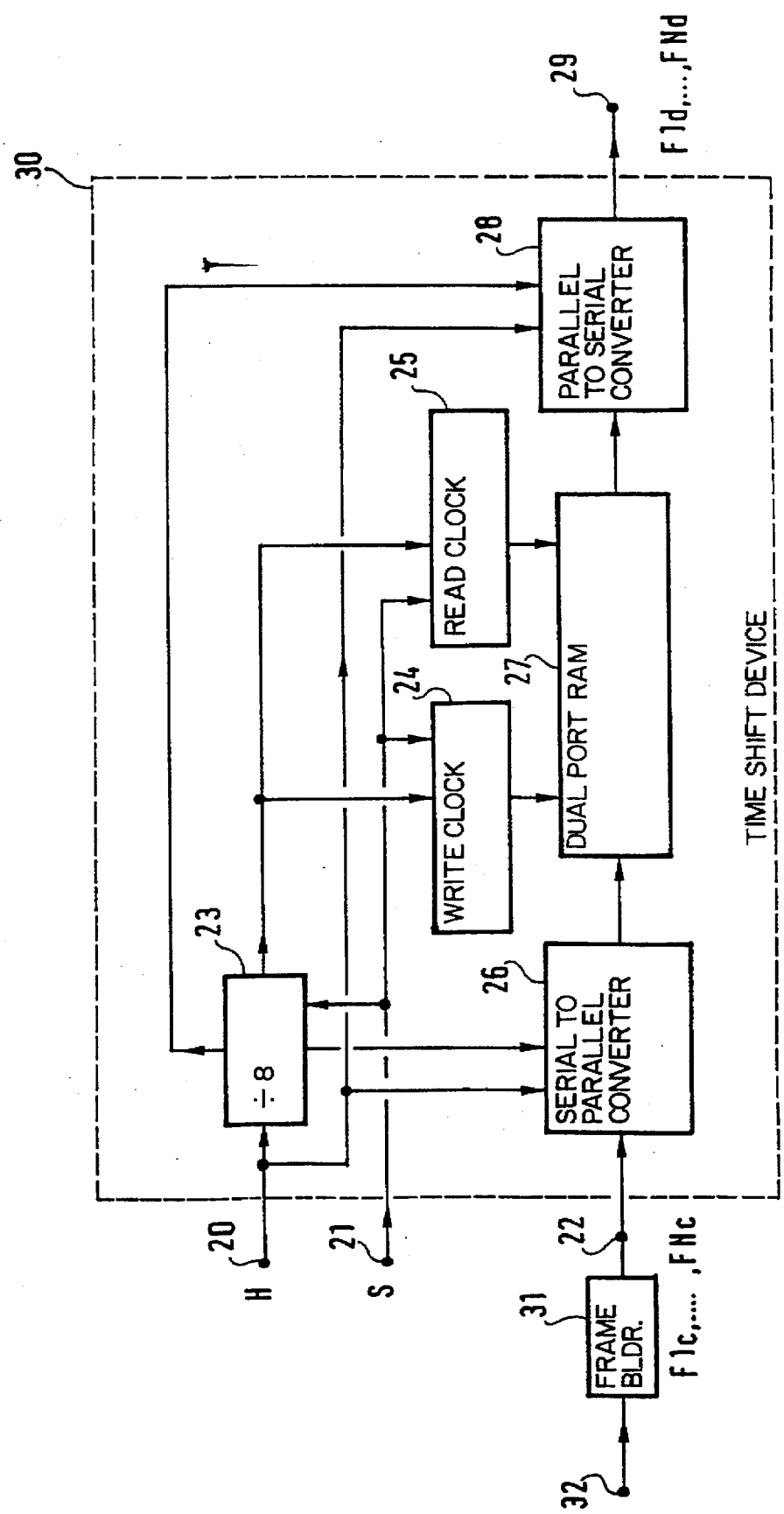
FIG. 5 represents the block schematic of one embodiment of these means.

FIG. 5 represents the block schematic of one embodiment of means for sending multiframes that underuse the capacity of a data source and retain its bit rate. This device can be used to send multiframes either from a central station to the local stations or from a local station to a central station.

This embodiment includes: a conventional frame builder device 31 having an input 16 connected to a data source and an output supplying frames F1c, ..., FNc, each including n–m bytes, at a bit rate H, two consecutive frames being separated by a free period corresponding to bytes, and a time-shift First In, First Out (FIFO) memory device 30 for forming multiframes.

The device 30 includes:

an input 20 receiving a clock signal H at the bit rate of the data in frames F1c, ..., FNc;

an input 21 receiving a synchronization signal S at the multiframe bit rate;

an input 22 receiving the data frames F1c, ..., FNc in serial form;

an output 29 supplying a multiframe made up of frames F1d, ..., FNd and a free period corresponding to 9 bytes;

a frequency divider 23 that divides by eight and has a clock input connected to the input 20, a synchronization input connected to the input 21 and three outputs;

a serial-parallel converter 26 having a data input connected to the input 22, a first clock input connected to the input 20, a second clock input connected to a first output of the divider 23 supplying a clock signal at the bit rate H/8 of the bytes of the frames F1c, ..., FNc, and one output;

a dual port random access memory 27 having a data input connected to the output of the device 26, a write command input, a read command input and an output;

a parallel-serial converter 28 having a data input connected to the output of the memory 27, a first clock input connected to the input 20, a second clock input connected to a second output of the divider 23 supplying a clock signal at the bit rate H/8 which is that of the bytes in frames F1d, ..., FNd, and an output connected to the output 29;

a write clock 24 having a clock input connected to a third output of the divider 23 and supplying a clock signal at the bit rate H/8 of the bytes in frames F1c, ..., FNc, a synchronization input connected to the input 21 and an output connected to the write command input of the memory 27;

a read clock 25 having a clock input connected to the second output of the divider 23 supplying a clock signal at the bit rate H/8, a synchronization input connected to the input 21 and an output connected to the read command input of the memory 27.

The memory 27 has a capacity corresponding to at least $\alpha$ bytes, the latter being stored byte by byte. The converter 26 stores the data bits from frames F1c, ..., FNc in the form of bytes. The converter 28 converts to serial form the data read byte by byte from the memory 27. For each frame F1c, ..., FNc the write clock 24 commands the writing of n–m bytes at the bit rate H/8 and then commands no writing during a time period corresponding to bytes. For each multiframe the read clock 25 commands no reading for a time period corresponding to $\alpha$ bytes and then commands p–q reads of one byte at the bit rate H/8. The frames F1d, ..., FNd are therefore time-shifted relative to the respective frames F1c, ..., FNc with time-shifts such that the free periods m between these frames are eliminated and such that the frames F1d, ..., FNd form a continuous stream of bits and are preceded by a single free period.

Prior art transmit time measurement and prior art reflectometry measurement means can be used in a network in accordance with the invention.

The invention can be applied to any time division multiple access point-to-multipoint network and in particular those in which the data sources are synchronous or plesiochronous.

What is claimed is:

1. Time division multiple access point-to-multipoint transmission network including a central station and a plurality of local stations;

each local station including means for sending return multiframes including a plurality of return frames and a single free period having a duration allowing measurements to be made, each return frame including a plurality of return subframes each having a fixed duration and containing data sent by that local station only and addressed to said central station, return subframes being sent at predetermined times decided on by transmit time measurement means so that subframes sent by all said local stations are received by said central station without overlapping and constitute a return frame;

said central station including means for sending forward multiframes including a plurality of forward frames and a single free period having a duration allowing measurements to be made;

wherein, in said central station and/or at least one local station, said means for sending multiframes include:

means for sampling from a data source a series of data packets, two consecutive packets being separated by a free period, and for inserting each packet into a frame, two consecutive frames being separated by a free period; and time-shift means for inserting a predetermined number of frames into a multiframe, time-shifting said frames to eliminate the free periods between them and thus to constitute a multiframe including a single continuous stream of time-shifted frames and a single free period.

2. The transmission network of claim 1 wherein said time-shift means include sufficient memory for storing at least a number of bits corresponding to said single free period.

3. The transmission network of claim 1 wherein said time-shift means include a dual-port memory having an input clock and output clock, said memory input clock is disabled for each said free period between said consecutive frames, and said memory output clock is periodically disabled for a duration equivalent to said single free period accumulated from a predetermined number of said free periods between said consecutive frames.

4. The transmission network of claim 3 wherein said memory further comprises a FIFO including: a serial-to-parallel converter, a parallel-to-serial converter, and control means for controlling said converters and memory such that an input bit stream is converted to a parallel stream, stored into and read from said dual-port memory, and then converted back to an output bit stream according to said input clock and said output clock.

5. A time division multiple access point-to-multipoint transmission network including a central station and a plurality of local stations connected to a common transmission path;

said central station including means for sending forward frames, said forward frames each including a single free period having a duration allowing response-time measurements to be made;

each local station including means for sending return frames, said return frames each including a plurality of subframes and a single free period having a duration allowing response-time measurements to be made;

wherein each subframe is sent by a respective local station at a predetermined time relative to a frame start time, said predetermined time being adjusted according to said response-time measurements for said each respective local station; and wherein said means for sending forward frames and means for sending return frames include:

means for building a shift frame comprising a single free period and a plurality of input data subframes clocked from a data source with free periods inserted between each two consecutive input data subframes; and time-shift means for storing a predetermined number of bits of consecutive shift frames, accumulating the free period of each said shift frame, and generating a multiframe including a single continuous stream of time-shifted shift frames and a single accumulated free period.

6. The transmission network of claim 5 wherein said time-shift means include a FIFO memory having an input clock and an output clock, and sequentially storing a predetermined number of bits of said shift frames using said input clock, said output clock being enabled for a predetermined number of said shift frames, and then disabled for a time corresponding to said predetermined number of shift frames.

7. The transmission network of claim 6 wherein said predetermined number of bits is determined by the free period in each shift frame.

8. The transmission network of claim 6 wherein said FIFO memory includes sufficient memory for storing at least a number of bits corresponding to said accumulated free period.

* * * * *